(12) United States Patent
Nakamura (10) Patent No.: US 6,636,945 B2
(45) Date of Patent: Oct. 21, 2003

(54) HARDWARE PREFETCH SYSTEM BASED ON TRANSFER REQUEST ADDRESS OF CACHE MISS LOAD REQUESTS

(75) Inventor: Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/907,608

(22) Filed: Jul. 19, 2001

(65) Prior Publication Data

US 2002/0144062 A1 Oct. 3, 2002

(30) Foreign Application Priority Data

Mar. 29, 2001 (JP) .................................. P2001-094532

(51) Int. Cl.[7] .............................................. G06F 12/00
(52) U.S. Cl. ...................... 711/137; 711/213; 712/207; 712/237; 712/240
(58) Field of Search ............................... 711/137, 213, 711/118; 712/207, 237, 240

(56) References Cited

U.S. PATENT DOCUMENTS

| | | | |
|---|---|---|---|
| 5,345,560 A | 9/1994 | Miura et al. ................... 711/3 |
| 5,802,566 A * | 9/1998 | Hagersten ................... 711/137 |
| 5,822,616 A * | 10/1998 | Hirooka ....................... 710/22 |
| 6,085,291 A * | 7/2000 | Hicks et al. ................. 711/137 |
| 6,173,392 B1 | 1/2001 | Shinozaki .................... 712/207 |
| 6,253,289 B1 * | 6/2001 | Bates et al. .................. 711/137 |
| 6,321,301 B1 * | 11/2001 | Lin et al. ..................... 711/137 |

* cited by examiner

*Primary Examiner*—Donald Sparks
*Assistant Examiner*—Jasmine Song

(57) ABSTRACT

The data-transfer latency of a cache-miss load instruction is shortened in a processor having a cache memory. A load history table wherein a transfer address of the cache-miss load instruction is registered is provided between the processor and a memory system. When access addresses are sequential, a request for hardware prefetch to a successive address is issued and the address is registered into a prefetch buffer. Further, when a cache-miss load request to the successive address is issued, the data are transferred from the prefetch buffer directly to the processor. The system may include multiple simultaneous prefetches and a prefetch variable optimized using software.

14 Claims, 5 Drawing Sheets

HARDWARE PREFETCH SYSTEM BASED ON TRANSFER REQUEST ADDRESS OF CACHE MISS LOAD REQUESTS

This application claims priority to Japanese Patent Application No. P2001-094532.

BACKGROUND OF THE INVENTION

1. Field of the Invention

The present invention relates generally to memory systems for high-performance computer systems and, more particularly, relates to memory systems for high-performance computer systems having a mechanism to make a hardware prefetch in accordance with the patterns of memory-access addresses in data fetch wherein a cache miss has occurred to thereby improve the memory-access performance.

2. Description of the Background

Because the processing performance of computer system memories has been progressing slower than that of the processors, the performance gap between memories and processors has been increasing every year. Therefore, a cache memory is built in most processors to partially make up for this gap. However, because the cache memory makes use of the temporal and spatial locality of data, the cache memory often fails to work effectively in memory-access patterns without locality, which may significantly reduce the performance of the processor. This phenomenon is often observed in large-scale scientific and technical computing wherein access tends to be made in sequence to arrayed data with little data reused.

To address this problem, the prefetch instruction has been used for software to transfer data in advance from a memory to a cache memory. In the case that list access is made to a data array, or in the case of a program described in an object-oriented language, software often fails to insert the prefetch instruction even if the memory-access pattern is sequential.

On the other hand, methods invented for prefetch with hardware include: (i) methods of making a hardware prefetch of a data stream which has already been prefetched once and (ii) methods of making a hardware prefetch if the difference between the address of the past memory access and the present memory access falls into a prescribed range. One of the former methods (i) is disclosed in U.S. Pat. No. 5,345,560; one of the latter methods (ii) is disclosed in U.S. Pat. No. 6,173,392.

In the case of the former methods, however, hardware prefetch can be made only to data streams which have already been prefetched once, and the hardware prefetch is therefore ineffective for data streams which have yet to be prefetched. In the case of the latter methods, although the address of data to be prefetched is generated by adding the interval of said address to the present access address, this hardware prefetch often fails to eliminate the latency in data transfer from the main memory to the cache memory.

Because instructions are scheduled in a processor with a built-in cache memory based on an assumption that the latency of the cache memory is short, processing performance falls significantly if a cache miss occurs. Such a cache miss often occurs in sequential memory-access patterns.

SUMMARY OF THE INVENTION

Accordingly, the present invention preferably provides a system and method to shorten the memory-access latency, even if data to be prefetched are in sequential addresses, which may thereby lessen the adverse effects of cache misses on performance.

A computer system according to one aspect of the present invention is characterized by: (i) a request-generating mechanism which stores the history of memory-access addresses in data fetch in which a hardware cache miss occurred, generates with hardware a demand to fetch data to an address advanced by a prefetch interval set by software, and fetches data from the main memory before further cache-miss data fetch takes place; and (ii) a buffer which stores the data transferred from the main memory in accordance with the requests issued by the request-generating mechanism. With these features, the data-transfer latency in cache-miss data fetch may be reduced.

In accordance with the invention described above, regarding a cache-miss load instruction, when the data to be transferred are in sequential addresses, such data transfer can be accelerated. Specifically, in the present invention, the history of the transfer request address of the cache-miss load instruction is registered so that a cache-miss load regarding consecutive addresses is detected and a request for hardware prefetch to a successive address can be issued. Also, since a prefetch interval register can be set with software, it is possible to let the transfer timing of prefetch data and the timing of data utilization coincide. In the present invention, data transferred from a memory system by the prefetch request that hardware issues may be stored in a dedicated prefetch buffer. Accordingly, data in a processor's cache memory is not expelled, and the data-transfer latency of the cache-miss load instruction may be shortened.

Other features, objects, and/or advantages of the invention will appear more fully from the following detailed description, figures, and attached claims.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 1:
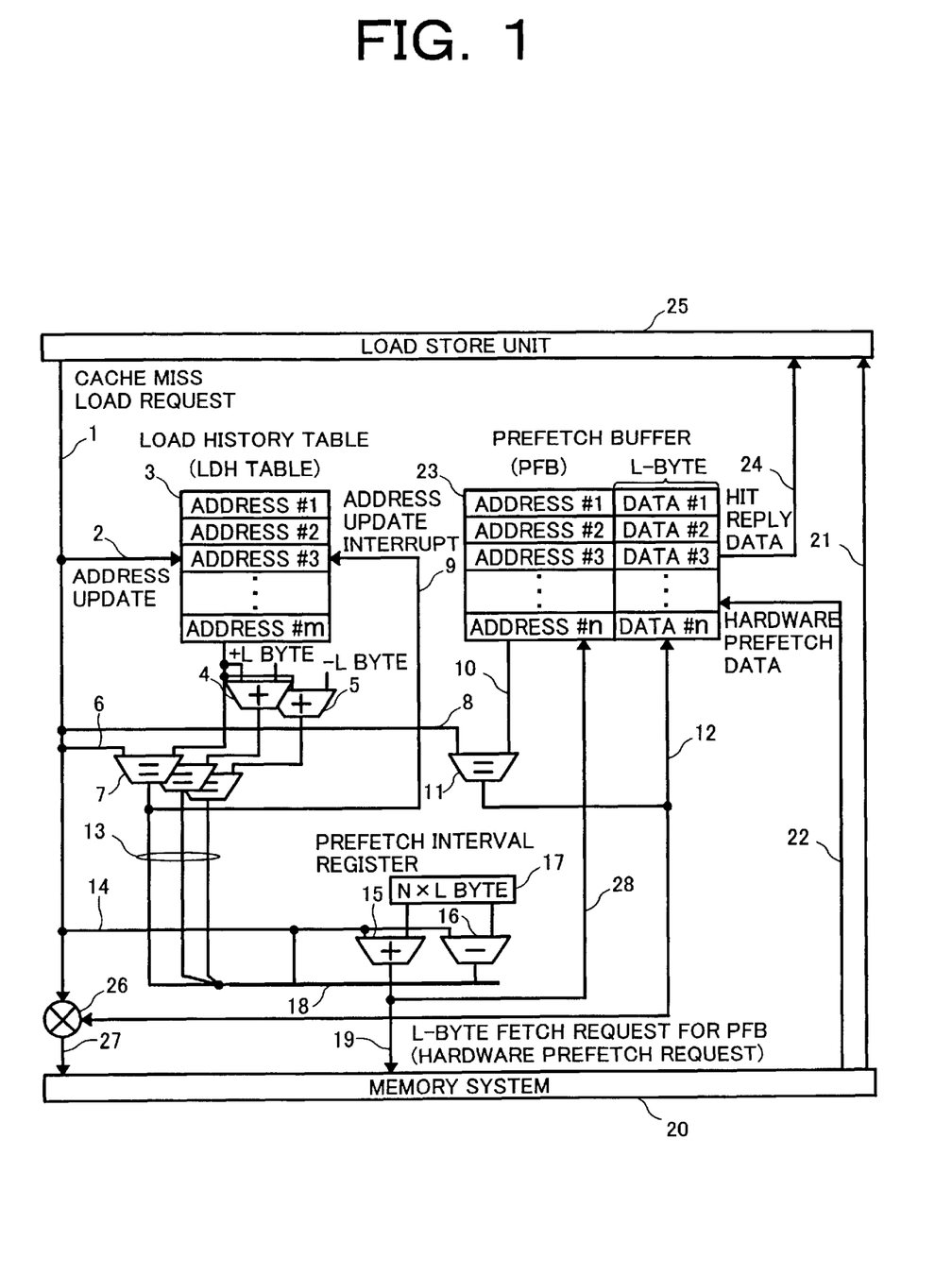
FIG. 1 is a block diagram showing a system configuration of an exemplary embodiment of the present invention.

FIG. 1 shows a preferred embodiment of a hardware prefetch system according to the present invention. In FIG. 1, when a load/store unit 25 for processing load instructions and store instructions in a processor issues a request (a "cache-miss load request") 1 regarding a load instruction which has not hit on the target data in a cache memory, a transfer request address 2 included in the request (a "present transfer request address") is registered in a load history table (LDH table) 3. If the same address as the transfer request address 2 is already registered in the load history table 3, the transfer request address 2 need not be registered in the load history table 3.

The load history table 3 retains a number of addresses "m" (m is an integer greater than or equal to 1). Registered in the load history table 3 are the addresses ("previous transfer request addresses") of the latest "m" cache-miss load requests 1. The addresses of requests by prefetch instructions may be included in the addresses that are registered in the load history table 3. When a new address is entered into the load history table 3, the new address preferably displaces a registered address in the table that is either the oldest registered address or the address that has recently been hit the least.

A group of comparators 7 compares the value of a transfer request address 6 of the cache-miss load request 1 with: the "m" address values in the load history table 3; a value equal to each of the "m" address values plus "+L bytes;" and a value equal to each of the "m" address values plus "−L bytes" ("L" being a positive real number). If the value of the transfer request address 6 of the cache-miss load request 1 coincides with one of the "m" address values registered in the load history table 3, the signal line 9 interrupts the registration of the transfer address 6 of the cache-miss load request 1 into the load history table 3. In other words, if the system detects that the transfer request address 6 of the cache-miss load request 1 is already registered in the load history table 3, the same address is prevented from being registered twice (or more) into the load history table 3. This multiple-registration blocking function utilizing the address-update interrupt signal line 9 is preferred but not indispensable.

A comparator 11 preferably compares the value of a transfer request address 8 of the cache-miss load request 1 with the values of "n" addresses 10 registered in a prefetch buffer (PFB) 23 ("n" being an integer equal to 1 or greater). If one or more address values 10 in the prefetch buffer 23 coincides with the transfer request address 8 of the cache-miss load request 1, the "hit" address(es) is conveyed through a hit signal line 12 to the prefetch buffer 23. The prefetch buffer 23 transfers the data corresponding to the hit address(es) though a hit reply data line 24 to the load/store unit 25.

When the hit signal line 12 indicates a hit, a request issuer 26 prevents the cache-miss load request 1 from reaching the memory system 20. Only when the hit signal line 12 indicates no hit of the prefetch buffer does the request issuer 26 issue a request to the memory system 20. Therefore, in the case where there is a hit in the prefetch buffer 23, the cache-miss load request 1 does not reach the memory system 20, and the relevant data are transferred from the prefetch buffer 23 to the load/store unit 25 (without having to use a regular memory call). This process preferably shortens the data-transfer latency.

The prefetch buffer 23 stores "n" entries and each entry consists of an address value and data values of "L" bytes. When a new entry displaces an entry in the prefetch buffer 23, the oldest registered entry or the entry that has recently been hit the least is preferably chosen as the one to be displaced.

A fetch request (hardware prefetch request) 19 is preferably generated from a transfer request address 14 of the cache-miss load request 1 that requests the data of "L" bytes to be transferred to the prefetch buffer 23. The same address as the transfer request address 14 of the cache-miss load request 1, an address equal to the transfer address 14 plus N×L bytes (N is an integer equal to 1 or larger), and an address equal to the transfer request address 14 minus N×L bytes are prepared, and a selector 18 chooses only one among the three addresses as the transfer address of the hardware prefetch request 19.

Values of N×L bytes are set in a prefetch interval register 17. The above addition and subtraction are made by an adder 15 and a subtracter 16, respectively. The above choice is made by the bundle of compare-result signal lines 13 of the group of comparators 7. If the group of comparators 7 finds that one of the "m" addresses coincides with the transfer request address 6 of the cache-miss load request 1, the selector 18 chooses the hardware prefetch request 19 of which the address is the same as the transfer request address 14 of the cache-miss load request 1.

If the group of comparators 7 finds that one of the "m" address values obtained by adding "+L" bytes to each of the "m" address values in the load history table 3 coincides with the transfer request address 6 of the cache-miss load request 1, the selector 18 chooses the hardware prefetch request 19 of which the address is equal to the transfer request address 14 of the cache-miss load request 1 plus N×L bytes. If the group of comparators 7 finds that one of the "m" address values obtained by adding "−L" bytes to each of the "m" address values in the load history table 3 coincides with the transfer request address 6 of the cache-miss load request 1, the selector 18 chooses the hardware prefetch request 19 of which the address is equal to the transfer request address 14 of the cache-miss load request 1 minus N×L bytes. When the hardware prefetch request 19 is issued, it is conveyed to the prefetch buffer 23 by a hardware-prefetch-request issue signal 28 so as to secure an address for storing return data from the memory system 20 in response to the hardware prefetch request 19.

Upon receipt of the cache-miss load request 27 or the hardware prefetch request 19, the memory system 20 transfers data to the load/store unit 25 or the prefetch buffer 23, depending on the type of request. Specifically, upon receipt of the cache-miss load request 27, the memory system 20 transfers data not through the prefetch buffer 23, but directly to the load/store unit 25 through a data transfer line 21. Upon receipt of the hardware prefetch request 19, the memory system 20 transfers data to the prefetch buffer 23 through a data transfer line 22.

The prefetch interval is preferably determined by a prefetch interval register 17 which is an input source of the adder 15 and the subtracter 16. The prefetch interval register 17 is set to "N" times the data size of "L" bytes of the prefetch buffer 23, where "N" is an integer equal to 1 or larger to be determined by software.

Figure 2:
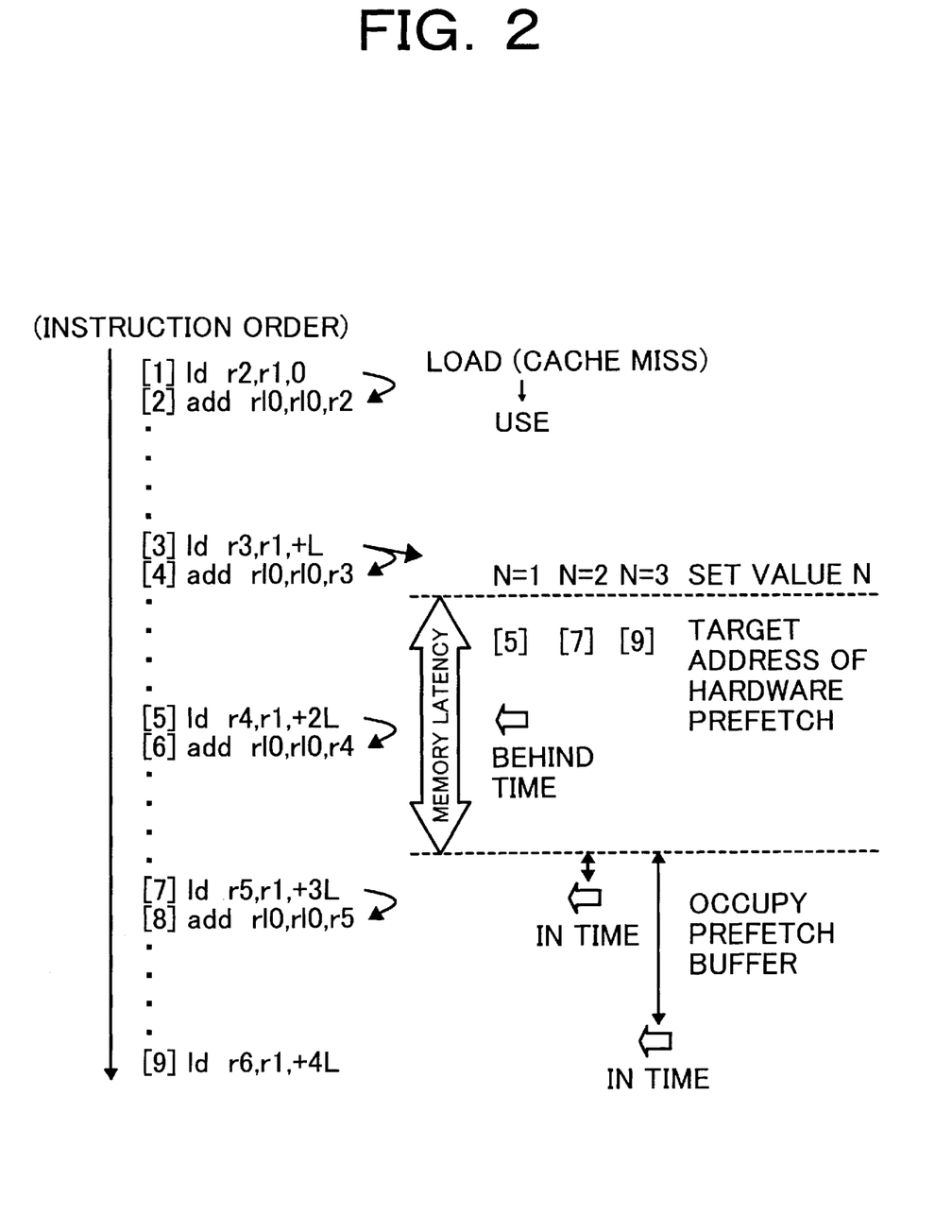
FIG. 2 is a conceptual diagram showing an example of setting a prefetch interval with software.

FIG. 2 shows an example of methods for setting "N" with software. In FIG. 2, instructions are processed from top to bottom. Load instructions [1], [3], [5], [7], and [9] perform data fetch from the addresses of a set value in a register "r1"

plus 0, L, 2L, 3L, and 4L, respectively. The first four load instructions have caused a cache miss, and the data-transfer latency from the memory system 20 is indicated by a large outlined arrow in FIG. 2.

Assuming that the software sets "N" to 2 in the prefetch interval register 17, the cache-miss load instruction [3] causes a request for hardware prefetch from the load request address of the load instruction [7] to be issued. Accordingly the data transfer from the memory system 20 to the prefetch buffer 23 is completed by the time of actual execution of the load instruction [7]. Therefore the data are transferred from the prefetch buffer 23 to the load/store unit 25 in accordance with the load instruction [7], and an add instruction [8] is immediately executed.

Assuming that the software sets "N" to 1 in the prefetch interval register 17, the cache-miss load instruction [3] causes a request for hardware prefetch from the load request address of the load instruction [5] to be issued. Accordingly the data transfer from the memory system 20 to the prefetch buffer 23 is not completed yet by the time of actual execution of the load instruction [5]. Therefore the data-transfer latency of the load instruction [5] is not reduced as effectively as that of the load instruction [7] with N=2.

Assuming that the software sets "N" to 3 in the prefetch interval register 17, the cache-miss load instruction [3] causes a request for hardware prefetch from the load request address of the load instruction [9] to be issued. Accordingly the data transfer from the memory system 20 to the prefetch buffer 23 is completed by the time of actual execution of the load instruction [9]. However, the time period for which the prefetch buffer 23 is occupied is longer than that in the case of N=2.

Therefore the software preferably sets "N" to 2 as the optimal value for "N."

In this way, the software may determine the value of "N" based on the relationship among the execution and transfer address intervals of load instructions by instruction scheduling and the latency in data transfer from the memory system 20 so that the data transfer by a hardware prefetch can be completed by the time of the actual execution of the load instructions.

Figure 3:
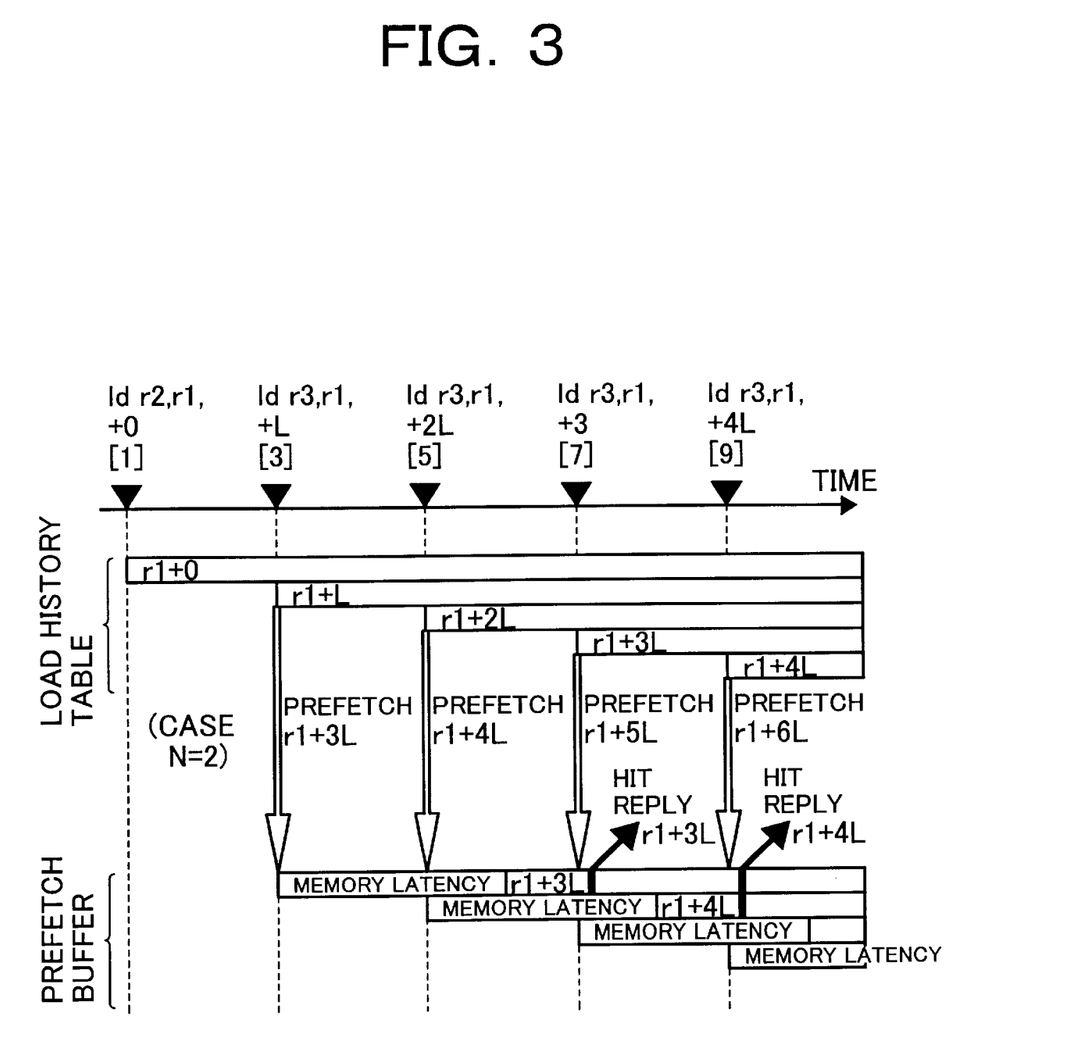
FIG. 3 is a conceptual diagram showing the operation of a hardware prefetch.

FIG. 3 shows schematically the states of the load history table 3 and the prefetch buffer 23 on the basis of N=2 in accordance with the order of instructions along the horizontal time axis. The load instruction [1] causes the address "r1+0" to be registered in the load history table 3. Then the load instruction [3] causes the address "r1+L" to be registered in the load history table 3. At the same time, because the address by the load instruction [3] coincides with the address "r1+0" by the load instruction [1] plus "L," a request for hardware prefetch from the address of "r1+L" plus "2×L" (i.e., "r1+3L") is issued. The request for hardware prefetch from the address of "r1+3L" causes the address of "r1+3L" to be registered into the prefetch buffer 23 and the prefetch buffer 23 waits for data transfer from the memory system 20.

In FIG. 3, the data arrive at the prefetch buffer 23 and are stored in an entry prepared for the data between the execution times of the instructions [5] and [7] after the memory latency. In the same way, the load instruction [5] causes the address "r1+2L" to be registered in the load history table 3. At the same time, because the address by the load instruction [5] coincides with the address "r1+L" by the load instruction [3] plus "L," a request for hardware prefetch from the address of "r1+2L" plus "2×L" (i.e., "r1+4L") is issued.

In the same way, the load instruction [7] causes the address "r1+3L" to be registered in the load history table 3, and a request for hardware prefetch from the address of "r1+5L" is issued. At the same time, because the address of "r1+3L" has data, the data is hit and transferred to the load/store unit 25. The load instructions from [9] onward are executed in the same way as the load instruction [7].

Figure 4:
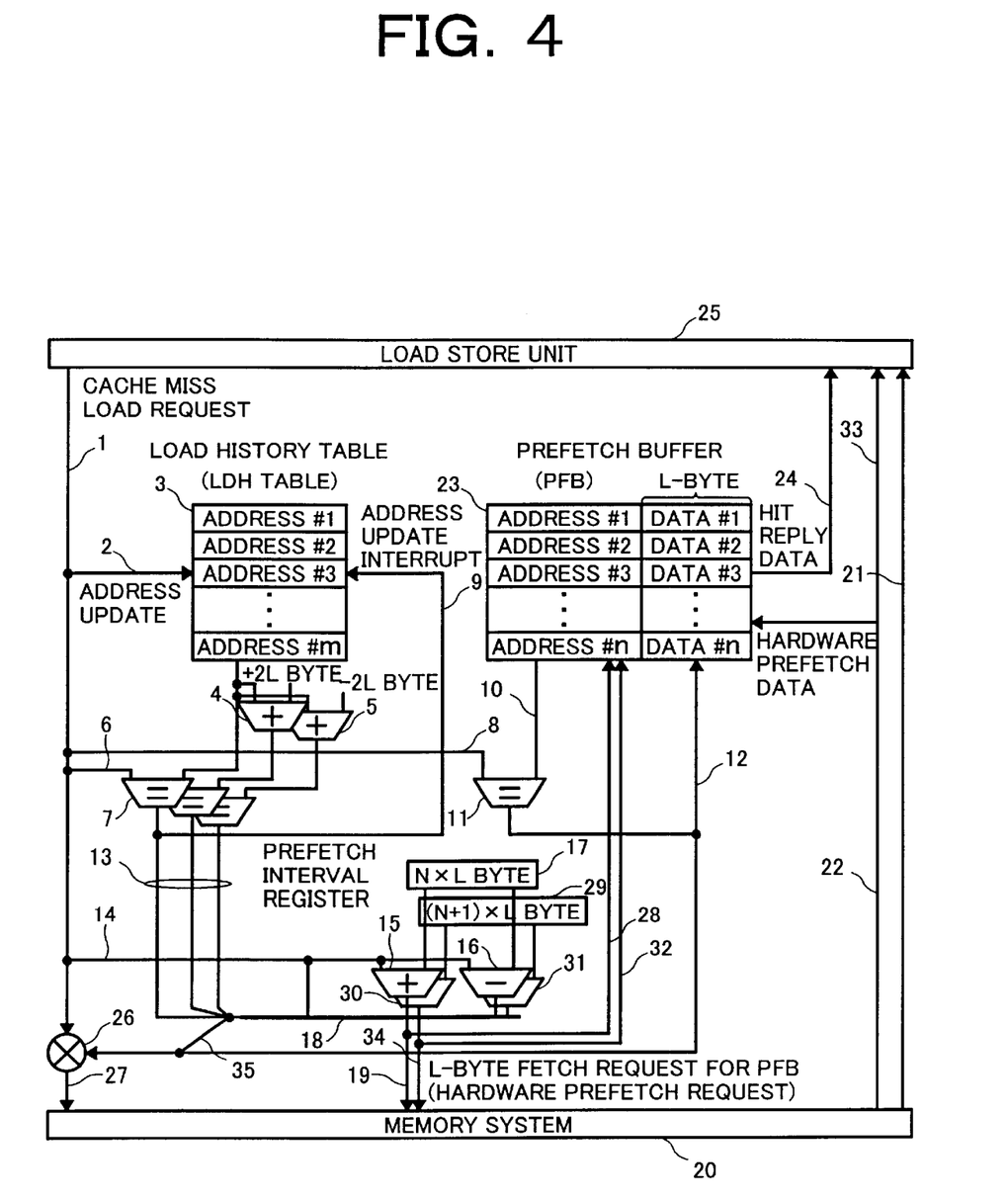
FIG. 4 is a block diagram showing a system configuration of an exemplary embodiment of the present invention.

FIG. 4 shows a further exemplary embodiment of a hardware prefetch system according to the present invention. There are at least three main differences shown between FIG. 1 and FIG. 4. First, in FIG. 4 the transfer request address 6 of the cache-miss load request 1 is compared with not only the address values in the load history table 3 but also the address values plus "+2L bytes" and the address values plus "−2L bytes."

The FIG. 4 system also includes another prefetch interval register 29 provided in addition to the prefetch interval register 17. The prefetch interval register 29 is set to the value of "(N+1)×L bytes." The values of the prefetch interval register 17 and 29 are added to and subtracted from the transfer request address 14 of the cache-miss load request 1. If the transfer request address 6 of the cache-miss load request 1 coincides with an address in the load history table 3 plus "2L bytes," the adder 15 and another adder 30 issue a request 19 for hardware prefetch from the address equal to the transfer request address 14 plus "N×L bytes" and a request 34 for hardware prefetch from the address equal to the transfer request address 14 plus "(N+1)×L bytes," respectively.

Hardware-prefetch-request issue signals 28 and 32 secure two addresses in the prefetch buffer 23. However, if the transfer request address 8 of the cache-miss load request 1 coincides with one of the addresses in the prefetch buffer 23, a hit signal line 35 causes the selector 18 to make a choice to make ineffective the requests for hardware prefetch from the transfer request address 14 plus "N×L bytes" and the transfer request address 14 minus "N×L bytes."

A third difference is that when data are transferred to the hardware prefetch buffer 23 through the data transfer line 22, the data may also be transferred to the processor through a data transfer line 33, which extends from the data transfer line 22 to the load/store unit 25, and stored in the cache memory in the processor. In this way, data may be loaded into the prefetch buffer and the load/store unit at the same time.

Additional embodiments of the present invention may include one, two or all of the above three additional features, in any combination.

For "+2L bytes" and "−2L bytes" to be added to the addresses in the load history table 3 described as the first additional feature, "+ML bytes" and "−ML bytes" may be substituted ("M" being an integer equal to 1 or larger). With respect to the second additional feature, the number of prefetch interval registers may be two or more. If "M" prefetch interval registers are provided, the address value to be set in the "i-th" prefetch interval register is (N−1+i)×L bytes ("i" being an integer equal to 1 or larger but not greater than M) Accordingly "M" adders 15, 30, "M" subtractors 16, 31, "M" hardware prefetch requests 19, 34 and "M" hardware-prefetch-request issue signal lines 28, 32 may be provided or issued. However, when the hit signal line 35 indicates a hit, the requests other than the requests for hardware prefetch to the addresses equal to the transfer address 14 plus and minus the prefetch interval of the "M-th" prefetch interval register are preferably made ineffective.

Figure 5:
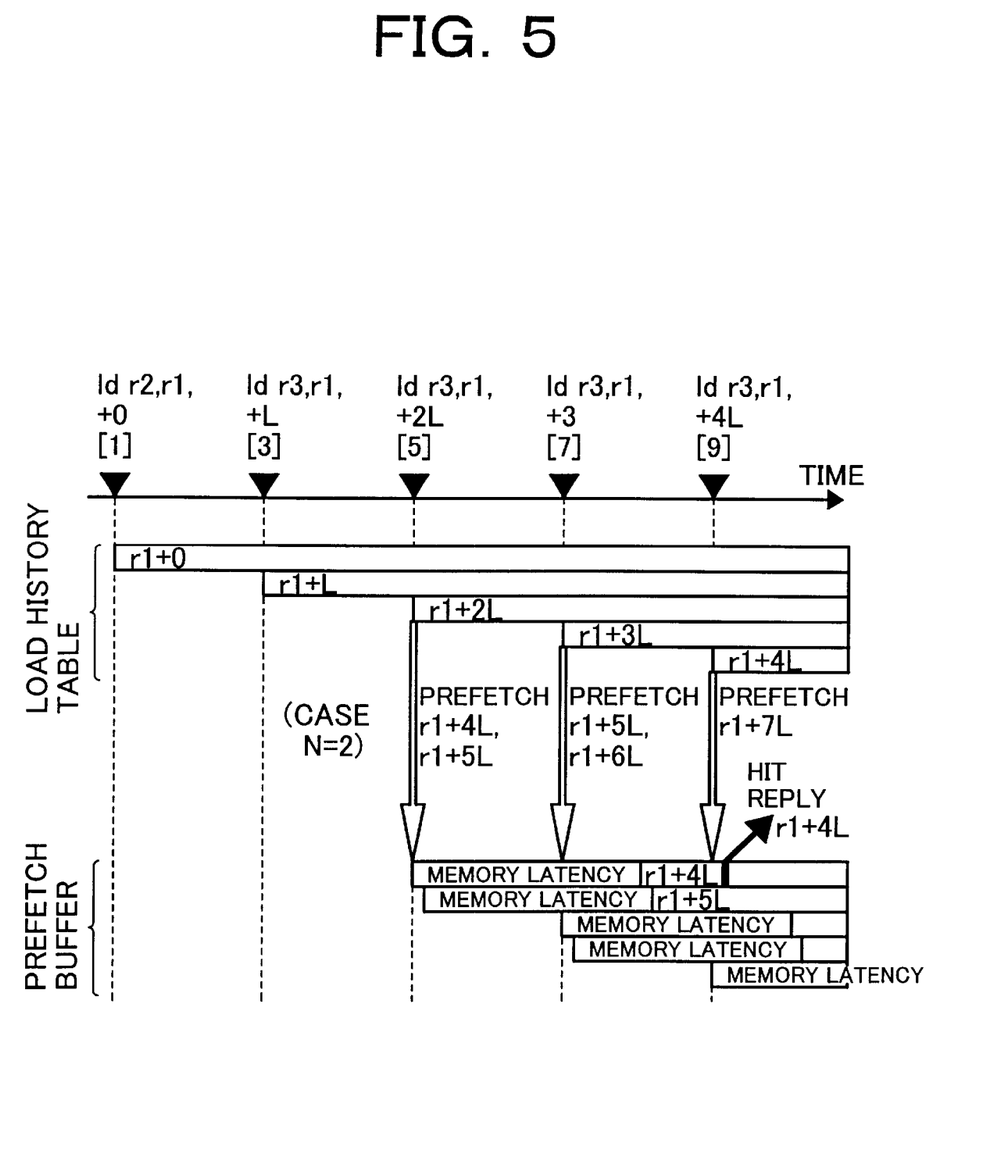
FIG. 5 is a conceptual diagram showing the operation of a hardware prefetch.

With respect to a program code shown in FIG. 2 in the embodiment of FIG. 4, FIG. 5 shows schematically the states of the load history table 3 and the prefetch buffer 23 on the basis of N=2 in accordance with the order of instructions along the horizontal time axis.

The foregoing invention has been described in terms of preferred embodiments. However, those skilled, in the art will recognize that many variations of these embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A prefetch system in a computer system having a processor, a cache memory, and a main memory, the prefetch system comprising:
   means for setting a variable indicating a prefetch interval into a register in accordance with a software being executed in said computer system;
   a load history table adapted to store a plurality of previous transfer request addresses of cache miss load requests issued by said processor;
   a first comparator for comparing a present transfer request address of a present cache miss load request with said previous transfer request addresses stored in the load history table plus a constant;
   a second comparator for comparing said present transfer request address with said previous transfer request addresses stored in the load history table minus the constant; and
   transfer-requesting means for generating a data transfer request which designates a prefetch target address to prefetch data therefrom if any of comparison results of said first and second comparators is true and for sending the data transfer request to the main memory, wherein said prefetch target address is equal to said present transfer request address plus said prefetch interval if a comparison result of said first comparator is true and said prefetch target address is equal to said present transfer request address minus said prefetch interval if a comparison result of said second comparator is true.

2. The prefetch system of claim 1, wherein said data transfer request includes the size of the data to be transferred.

3. The prefetch system of claim 1, further comprising:
   a prefetch buffer provided between the cache memory and the main memory adapted to hold a plurality of prefetch data and corresponding prefetch addresses thereof; and
   means for registering data transferred from the main memory in accordance with said sent data transfer request in said prefetch buffer.

4. The prefetch system of claim 3, further comprising a third comparator for comparing said present transfer request address with said previous transfer request addresses stored in said load history table,
   and wherein said transfer-requesting means generates a data transfer request designating said present transfer request address as the prefetch target address if a comparison result of said third comparator is true.

5. The prefetch system of claim 3, further comprising:
   means for comparing said present transfer request address with each of said plurality of prefetch addresses in the prefetch buffer; and
   means for sending data associated with a prefetch address that matches the present transfer request address to the processor.

6. The prefetch system of claim 5, wherein said means for sending the piece of data is adapted to send the piece of data directly to the processor from the prefetch buffer without the use of the main memory.

7. The prefetch system of claim 5, further comprising:
   means for preventing a data load instruction request associated with said present transfer request address from reaching the main memory in the case where at least one of said plurality of prefetch addresses stored in the prefetch buffer matches the present transfer request address.

8. The prefetch system of claim 1, wherein said transfer-requesting means further comprises:
   means for generating a second data transfer request which designates a second prefetch target address to prefetch data therefrom if any of the comparison results of said first and second comparators is true, wherein the address interval between said second prefetch target address and said present transfer request address is wider than said prefetch interval.

9. A hardware prefetch method for a computer system including a processor, a cache memory, and a main memory, said prefetch method comprising the steps of:
   setting a variable into a register according to a prefetch interval indicated in a software being executed in said computer system;
   receiving a cache miss load request address as a present transfer request address;
   comparing said present transfer request address to a plurality of previous transfer request addresses stored in a load history table plus a constant and to said plurality of previous transfer request addresses stored in the load history table minus the constant;
   generating a prefetch request designating a prefetch target address to prefetch data therefrom if any of the comparison results in said comparing step is true, wherein said prefetch target address is equal to said present transfer request address plus said prefetch interval if said present transfer request address coincides with one of said previous transfer request addresses plus the constant, and said prefetch target address is equal to said present transfer request address minus said prefetch interval if said present transfer request address coincides with one of said previous transfer request addresses minus the constant; and
   sending said generated prefetch request to the main memory.

10. The method of claim 9, further includes a step of:
    comparing said present transfer request address to said previous transfer request addresses stored in the load history table,
    generating a prefetch request designating said present transfer request address as the prefetch target address in a case in which said present transfer request address coincides with one of said previous transfer request addresses stored in the load history table.

11. The method of claim 10, further including the step of:

storing data transferred from the main memory in accordance with said sent prefetch request in a prefetch buffer at the same time said data is stored in a load/store unit in the computer system.

12. The method of claim 9, further comprising the steps of:

generating a second prefetch request designating a second prefetch target address to prefetch data therefrom if any of the comparison results in said comparing step is true, wherein the address interval between said second prefetch target address and said present transfer request address is wider than said prefetch interval; and sending said generated second prefetch request to the main memory.

13. The method of claim 9, further including the step of:

storing data received from the main memory in response to said sent prefetch request in a prefetch buffer.

14. The method of claim 9, further comprising the steps of:

comparing said cache miss load request address with a plurality of previous prefetch addresses stored in a prefetch buffer; and sending prefetch data associated with a previous prefetch address stored in the prefetch buffer that matches the cache miss load request address to a load/store unit in the computer system.

* * * * *